United States Patent Office
3,018,295
Patented Jan. 23, 1962

1

3,018,295
21-METHYLENE STEROID COMPOUNDS
Rudolph G. Berg, Groton, Sanford K. Figdor, Gales Ferry, and Gerald D. Laubach, Niantic, Conn., assignors to Chas. Pfizer & Co., Inc., New York, N.Y., a corporation of Delaware
No Drawing. Filed May 11, 1960, Ser. No. 28,182
7 Claims. (Cl. 260—397.3)

This application is concerned with new and useful steroid compounds and with therapeutically useful compositions containing them. More particularly, it is concerned with certain 21-methylene derivatives of progesterone characterized by having progestational activity. The compounds are also useful as intermediates for the preparation of certain 21-halomethyl derivatives of progesterone which also have useful progestational activity. These latter compounds are described and claimed in copending and concurrently filed patent application, Serial No. 28,183.

Compounds within the purview of this invention are represented by the formulas:

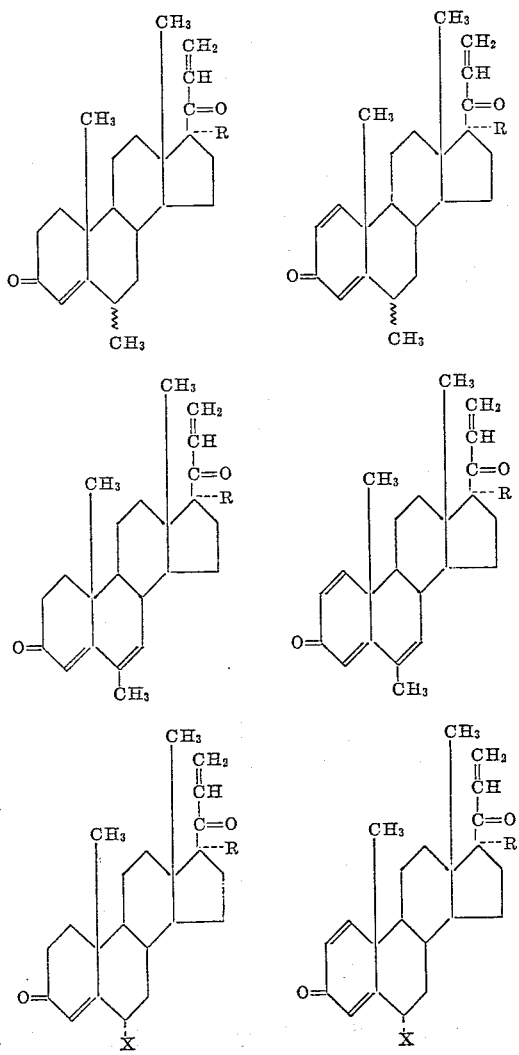

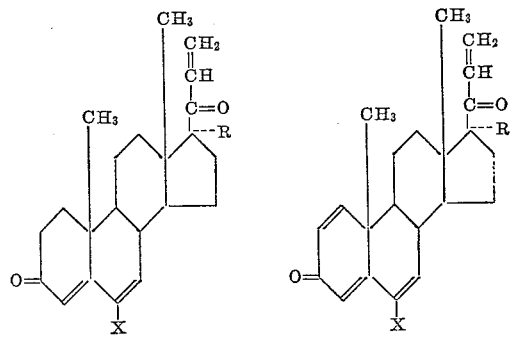

wherein X is selected from the group consisting of hydrogen, fluorine, chlorine and bromine and R is selected from the group consisting of hydrogen, hydroxyl and acylated hydroxyl, an acyl group being derived from mono- and dicarboxylic acids containing only carbon, hydrogen and oxygen up to a total of ten carbon atoms. The water solubility of compounds derived from dicarboxylic acids is enhanced by conversion to alkali metal or alkaline earth metal salts by reaction with a suitable base such as sodium carbonate or calcium hydroxide. These salts are included within the purview of the invention.

Suitable starting materials useful for the preparation of the valuable compounds of this invention include 21-quaternary ammonium methyl halide salts of compounds having the formulas shown above, except that dicarboxylic acid esters or their salts are not used. A typical starting material is 21 - dimethylaminomethyl-$\Delta^4$-pregnene-17$\alpha$-ol-3,20-dione methyl bromide represented by the formula:

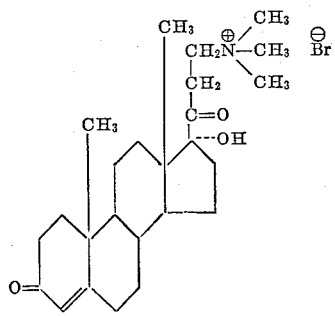

The starting materials are prepared in accordance with the procedure described in copending and concurrently filed patent application, Serial No. 28,181.

This application describes their preparation from 21-desoxy compounds by treatment with an excess of an amine salt and formaldehyde in an alkanol solvent containing up to five carbon atoms at a temperature of from about 90° C. to about 140° C. for from about two to about twenty-four hours. The 21-aminomethyl compounds so prepared are converted to quaternary ammonium halides by treatment with an alkyl halide containing up to four carbon atoms, preferably methyl bromide, in an alkanol solvent containing up to four carbon atoms at a temperature of from about 20° C. to about 30° C. for a period of from about six to about sixteen hours.

These latter compounds are converted to the valuable compound of this invention by reaction with water or aqueous alkali for from about one to about six hours at a temperature of from about 20° C. to about 30° C.

Temperatures below and above this preferred range can be used although less satisfactorily. Thus, if a temperature considerably below 20° C. is used, the reaction is too slow to be practical and if a temperature considerably above 30° C. is used, there may be some decomposition of the desired product.

Although the desired products form by simple reaction with water, they form more readily and often in higher yield if the reaction is carried out at an alkaline pH of from about 7.5 to about 12. The desired alkalinity may be effected by adding a small amount of aqueous alkaline reagent. Illustrative alkaline reagents include, for example, aqueous solutions containing from about 2% to about 10% by weight of an alkali or alkaline earth metal hydroxide, oxide, carbonate, bicarbonate or alkali metal acetates, tartrates or citrates. Approximately three to five percent by weight of aqueous sodium bicarbonate solution has been found to afford excellent yields, and this is the preferred reagent.

In summary, the desired products are formed by mixing the quaternary lower alkyl ammonium halides illustrated above in an aqueous solution at a pH of from about 7 to about 12 at a temperature of from about 20° C. to about 30° C. for a period of from about one to about six hours.

Usually the desired product will precipitate from the reaction mixture as it forms and reaction is complete when no more precipitate forms. Occasionally, however, the desired product will not precipitate. In these cases, the product may be isolated by extraction with a water immiscible hydrocarbon or halogenated hydrocarbon solvent including, for example, ethylene dichloride, chloroform, carbon tetrachloride, chlorobenzene, benzene and pentane. It is, of course, possible to use an extraction procedure whether or not the product precipitates, and this may often result in better overall yields. If an extraction step is used, it may be desirable to add a small amount of acid to the aqueous mixture to insure that all of the amine by-product of the main reaction is converted to an acid salt which is insoluble in the organic solvent.

Occasionally, when a quaternary iodide is used, the iodide salt which forms is insoluble in water. Obviously, this could lead to contamination of the final product particularly if it is insoluble in water and co-precipitates with the iodide salt. In these instances and in any other instances where there is co-precipitation of the main product and by-product, it is always preferred to use an extraction step.

The 21-methylene compounds are isolated from the organic solvent by removal of the solvent in vacuo preferably after drying the solvent using an anhydrous drying agent such as sodium or magnesium sulfate. The product may be further purified by recrystallization from a suitable solvent such as methyl alcohol.

It is also possible, and preferred, to generate the 21-methylene compounds of this invention in situ. This may be accomplished by forming the quaternary compound in methanol or ethanol in accordance with the usual procedure and decomposing the quaternary by refluxing for from about 5 to about 24 hours. The reaction is best carried out on an acid addition salt in the presence of an alkaline reagent such as sodium acetate. An excess of alkyl halide and base is used. The amount is not critical, for example 50% to 1000% molar excess may be used.

Compounds within the purview of the invention having a 17α-acylated hydroxyl group are prepared by conventional methods, i.e., treatment with the corresponding anhydride and a catalytic amount of p-toluenesulfonic acid. In the event the anhydride is a solid, a reaction inert solvent such as a halogenated hydrocarbon solvent containing up to two carbon atoms, is employed. With liquid anhydrides such as acetic anhydride or caproic anhydride, the anhydride itself serves as the solvent. Reaction is effected by simply maintaining the reactants in admixture with each other at a temperature of from about 20° C. to about 30° C. for a period of from about 10 to about 24 hours. Isolation is effected by evaporating the solvent in vacuo. The compound may be purified by recrystallization.

Metal salts of compounds esterified with dicarboxylic anhydrides are formed in accordance with standard methods. One may, for example, dissolve the compound in a minimum of water containing an equimolar portion of an alkali salt of the desired metal and precipitate the desired compound by the addition of a water miscible liquid which does not dissolve the salt. Ethanol is suitable. Alternatively, one simply evaporates the solvent in vacuo.

Free 17-hydroxy compounds are prepared from the corresponding esters by gentle hydrolysis using sodium or potassium carbonate in aqueous methanol.

The biologically active compounds of this invention may be administered alone or in combination with other active ingredients. They will usually be administered in compositions together with pharmaceutically acceptable carriers, the choice of which is determined by the preferred route of administration, the solubility of the compound and standard pharmaceutical practice. In general, the dosage of these compounds is of the same order of magnitude as the dosage of 17-acetoxyprogesterone, 17-ethynyl-19-nortestosterone and 17α-ethynyl-$\Delta^{5(10)}$-estren-17β-ol-3-one, and they are used to treat the same types of physiological conditions. Because of their high order of progestational activity, it is sometimes possible to utilize these compounds at a lower dosage level than is usually employed with the above-mentioned progestational agents.

As stated above, the compounds of this invention are also useful in the preparation of certain 21-halomethyl derivatives of progesterone which are useful because of their progestational action. The reaction by which these compounds are prepared is described more fully in the above-identified copending patent application, but in general it involves reaction between the steroid substrate and anhydrous hydrogen halide in a reaction inert organic solvent at a temperature of from about −30° C. to about 30° C. for a period of from about 10 minutes to about 80 minutes. The reaction with hydrogen fluoride is catalyzed with antimony trifluoride, and the reaction with hydrogen chloride is catalyzed with stannic chloride.

The following examples are given solely for the purpose of illustration and are not to be construed as limitations of this invention, many variations of which are possible without departing from the spirit or scope thereof.

EXAMPLE I

*21-methylene-$\Delta^{1,4}$-pregnadiene-17α-ol-3,20-dione*

A solution of 200 mg. of 21-dimethylaminomethyl-$\Delta^{1,4}$-pregnadiene-17α-ol-3,20-dione methyl bromide (prepared as described in copending and concurrently filed patent application, Serial No. 28,181) in 10 ml. of water was prepared and clarified by filtration. To the solution, there was added 68 mg. of sodium bicarbonate in 2 ml. of water at 25° C. A white precipitate separated immediately. The solution was stirred for one hour, washed with water and dried in vacuo. The residue was recrystallized from methanol to yield the desired product.

EXAMPLE II

*21-methylene-$\Delta^4$-pregnene-17α-ol-3,20-dione 17-acetate*

A solution containing 200 mg. of 21-dimethylaminomethyl-$\Delta^4$-pregnene-17α-ol-3,20-dione butyl chloride was dissolved in 10 ml. of water and stirred at 20° C. for 6 hours. The desired product separated and was recovered by filtration.

EXAMPLE III

*6α-methyl-21-methylene-$\Delta^4$-pregnene-17α-ol-3,20-dione 17-caproate*

A solution containing 200 mg. of 21-dimethylaminomethyl-6α-methyl-Δ⁴-pregnene-17α-ol-3,20-dione methyl bromide was dissolved in 15 ml. of water and clarified by filtration. The mixture was stirred for 4 hours and the desired product recovered by filtration.

6-methyl-Δ⁴,⁶-pregnadiene-17α-ol-3,20-dione 17 caproate and 6-methyl-21-methylene-Δ¹,⁴,⁶-pregnatriene-17α-ol-3,20-dione-17-caproate were similarly prepared.

EXAMPLE IV

6α-fluoro-21-methylene-Δ¹,⁴-pregnadiene-17α-ol-3,20-dione

A solution containing 400 mg. of 21-diethylaminomethyl-6α-fluoro-Δ¹,⁴-pregnadiene-17α-ol-3,20-dione ethyl chloride was dissolved in 15 ml. of water and the solution clarified by filtration. A 20% aqueous solution of sodium citrate in 2 ml. of water was added. The resulting mixture was stirred for 4 hours during which time the desired product separated and was recovered by filtration.

6α-fluoro-21-methylene-Δ⁴-pregnene-17α-ol-3,20-dione, 6-fluoro-21-methylene-Δ⁴,⁶-pregnadiene-17α-ol-3,20-dione and 6-fluoro-21-methylene-Δ¹,⁴,⁶-pregnatriene-17α-ol-3,20-dione were similarly prepared.

EXAMPLE V

6β-methyl-21-methylene-Δ¹,⁴-pregnadiene-17α-ol-3,20-dione 17-decanoate

A solution containing 200 mg. of 21-diethylaminomethyl-6β-methyl-Δ¹,⁴-pregnadiene-17α-ol-3,20-dione 17-decanoate methyl bromide was dissolved in 15 ml. of water and stirred at 25° C. for 4 hours. The desired product separated and was recovered by filtration.

6β-methyl-21-methylene-Δ⁴-pregnene-17α-ol-3,20-dione 17-decanoate, 6 methyl-21-methylene-Δ⁴,⁶-pregnadiene-17α-ol-3,20-dione 17-decanoate and 6-methyl-21-methylene-Δ¹,⁴,⁶-pregnatriene-17α-1-3,20-dione 17-decanoate were similarly prepared.

EXAMPLE VI

6α-chloro-21-methylene-Δ¹,⁴-pregnadiene-17α-ol-3,20-dione

A solution containing 300 mg. of 21-methyl ethylaminomethyl-6α-methyl-Δ¹,⁴-pregnadiene-17α-ol-3,20-dione butyl chloride was dissolved in 20 ml. of water adjusted to pH 9.5 with aqueous sodium carbonate and stirred at 30° C. for 6 hours. The desired product separated and was recovered by filtration.

EXAMPLE VII 6-chloro-21-methylene-Δ¹,⁴,⁶-pregnatriene-17α-ol-3,20-dione

A solution containing 150 mg. of 21-diethylaminomethyl-6-chloro-Δ¹,⁴,⁶-pregnatriene-17α-ol-3,20-dione methyl iodide was dissolved in 15 ml. of water and stirred at 25° C. for 4 hours. The resulting reaction mixture was extracted with chloroform, filtered and the desired product recovered by evaporation of the filtrate.

6α-chloro-21-methylene-Δ⁴-pregnene-17α-ol-3,20-dione and 6-chloro-21-methylene-Δ⁴,⁶-pregnadiene-17α-ol-3,20-dione were similarly prepared.

EXAMPLE VIII 6-fluoro-21-methylene-Δ¹,⁴,⁶-pregnatriene-17α-ol-3,20-dione

A solution containing 21-dipropylaminomethyl-6-fluoro-Δ¹,⁴,⁶-pregnatriene-17α-ol-3,20-dione butyl fluoride was stirred in 20 ml. of 5% aqueous sodium bicarbonate solution for 3 hours. The resulting mixture was made slightly acid with 2% aqueous hydrochloric acid and extracted with ethylene dichloride. The organic solvent was separated, dried over anhydrous sodium sulfate, filtered and the desired product isolated by evaporation of the solvent.

EXAMPLE IX 21-methylene-Δ¹,⁴-pregnadiene-3,20-dione

A solution of 200 mg. of 21-dimethylaminomethyl-Δ¹,⁴-pregnadiene-3,20-dione methyl bromide (prepared as described in copending and concurrently filed patent application, Serial No. 28,181) in 10 ml. of water was prepared and clarified by filtration. To the solution, there was added 68 mg. of sodium bicarbonate in 2 ml. of water at 25° C. A white precipitate separated immediately. The solution was stirred for one hour, washed with water and dried in vacuo. The residue was recrystallized from methanol to yield the desired product.

EXAMPLE X 21-methylene-Δ⁴-pregnene-3,20-dione

A solution containing 200 mg. of 21-dimethylaminomethyl-Δ⁴-pregnene-3,20-dione butyl chloride was dissolved in 10 ml. of water and stirred at 20° C. for 6 hours. The desired product separated and was recovered by filtration.

21-methylene-Δ⁴,⁶-pregnadiene-3,20-dione and 21-methylene-Δ¹,⁴,⁶-pregnatriene-3,20-dione were similarly prepared.

EXAMPLE XI

6α-methyl-21-methylene-Δ⁴-pregnene-3,20-dione

A solution containing 200 mg. of 21-dimethylaminomethyl-6α-methyl-Δ⁴-pregnene-3,20-dione methyl bromide was dissolved in 15 ml. of water and clarified by filtration. The mixture was stirred for 4 hours and the desired product recovered by filtration.

6α-methyl-21-methylene-Δ¹,⁴-pregnadiene-3,20-dione, 6-methyl-21-methylene-Δ⁴,⁶-pregnadiene-3,20-dione and 6-methyl-21-methylene-Δ¹,⁴,⁶-pregnadiene-3,20-dione were similarly prepared.

EXAMPLE XII

6α-fluoro-21-methylene-Δ¹,⁴-pregnadiene-3,20-dione

A solution containing 400 mg. of 21-diethylaminomethyl-6α-fluoro-Δ¹,⁴-pregnadiene-3,20-dione ethyl chloride was dissolved in 15 ml. of water and the solution clarified by filtration. A 2% aqueous solution of sodium citrate in 2 ml. of water was added. The resulting mixture was stirred for 4 hours during which time the desired product separated and was recovered by filtration.

6α-fluoro-21-methylene-Δ⁴-pregnene-3,20-dione was similarly prepared.

EXAMPLE XIII

6β-methyl-21-methylene-Δ¹,⁴-pregnadiene-3,20-dione

A solution containing 200 mg. of 21-diethylaminomethyl-6β-methyl-Δ¹,⁴-pregnadiene-3,20-dione methyl bromide was dissolved in 15 ml. of water and stirred at 25° C. for 4 hours. The desired product separated and was recovered by filtration.

6β-methyl-21-methylene-Δ⁴-pregnene-3,20-dione was similarly prepared.

EXAMPLE XIV

6α-chloro-21-methylene-Δ¹,⁴-pregnadiene-3,20-dione

A solution containing 300 mg. of 21-methyl ethylaminomethyl-6α-methyl-Δ¹,⁴-pregnadiene-3,20-dione butyl chloride was dissolved in 20 ml. of water adjusted to pH 9.5 with aqueous sodium carbonate and stirred at 30° C. for 6 hours. The desired product separated and was recovered by filtration.

6α-chloro-21-methylene-Δ⁴-pregnene-3,20-dione was similarly prepared.

EXAMPLE XV

*6-chloro-21-methylene-Δ¹,⁴,⁶-pregnatriene-3,20-dione*

A solution containing 150 mg. of 21-diethylaminomethyl-6-chloro-Δ¹,⁴,⁶-pregnatriene-3,20-dione methyl iodide was dissolved in 15 ml. of water and stirred at 25° C. for 4 hours. The resulting reaction mixture was extracted with chloroform, filtered and the desired product recovered by evaporation of the filtrate.

6-chloro-21-methylene-Δ⁴,⁶-pregnadiene-3,20-dione was similarly prepared.

EXAMPLE XVI

*6-fluoro-21-methylene-Δ¹,⁴,⁶-pregnatriene-3,20-dione*

A solution containing 21-dipropylaminomethyl-6-fluoro-Δ¹,⁴,⁶-pregnatriene-3,20-dione butyl fluoride was stirred in 20 ml. of 5% aqueous sodium bicarbonate solution for 3 hours. The resulting mixture was made slightly acid with 2% aqueous hydrochloric acid and extracted with ethylene dichloride. The organic solvent was separated, dried over anhydrous sodium sulfate, filtered and the desired product isolated by evaporation of the solvent.

EXAMPLE XVII

*21-methylene-Δ⁴,⁶-pregnadiene-17α-ol-3,20-dione 17-acetate*

A solution containing 200 mg. of 21-dimethylaminomethyl-Δ⁴,⁶-pregnadiene-17α-ol-3,20-dione methobromide was dissolved in 10 ml. of water and stirred at 20° C. for 6 hours. The desired product separated and was recovered by filtration.

21-methylene-Δ¹,⁴,⁶-pregnadiene-17α-ol-3,20-dione 17-acetate was similarly prepared.

EXAMPLE XVIII

*6-fluoro-21-methylene-Δ⁴,⁶-pregnadiene-3,20-dione*

A solution containing 400 mg. of 21-diethylaminomethyl-6-fluoro-Δ⁴,⁶-pregnadiene-3,20-dione ethyl chloride was dissolved in 15 ml. of water and the solution clarified by filtration. A 2% aqueous solution of sodium citrate in 2 ml. of water was added. The resulting mixture was stirred for 4 hours during which time the desired product separated and was recovered by filtration.

EXAMPLE XIX

*6-fluoro-21-methylene-Δ⁴,⁶-pregnadiene-3,20-dione*

A solution containing 13 g. of 21-dimethylaminomethyl-6-fluoro-Δ⁴,⁶-pregnadiene-3,20-dione hydrochloride, 7.5 g. of potassium acetate and 30 ml. of ethyl bromide in 250 ml. of ethanol was refluxed for 5 hours. It was concentrated to 2 volumes of 50 ml. and the desired product precipitated by the addition of 200 ml. of water. The mixture was stirred for 10 minutes and the product recovered by filtration.

EXAMPLE XX

A variety of 17-esters of the free alcohols prepared as described in the previous examples were each prepared by acylation using conventional methods. The compounds prepared include formate, propanoates, propenoates, isobutyrates, hexanoates, benzoates, octanoates, decanoates, hemisuccinates, trimethyl acetates, cyclopentylpropionates, etc. The acid esters of dicarboxylic acids such as the hemisuccinate have the advantage that alkali metal salts and alkaline earth metal salts can be prepared from them by treatment with molar proportions of a base such as sodium or potassium bicarbonate or barium hydroxide. These salts are water soluble, an advantage not possessed by the free alcohols themselves or by ordinary esters thereof.

What is claimed is:

1. A compound selected from the group consisting of those represented by the formulas:

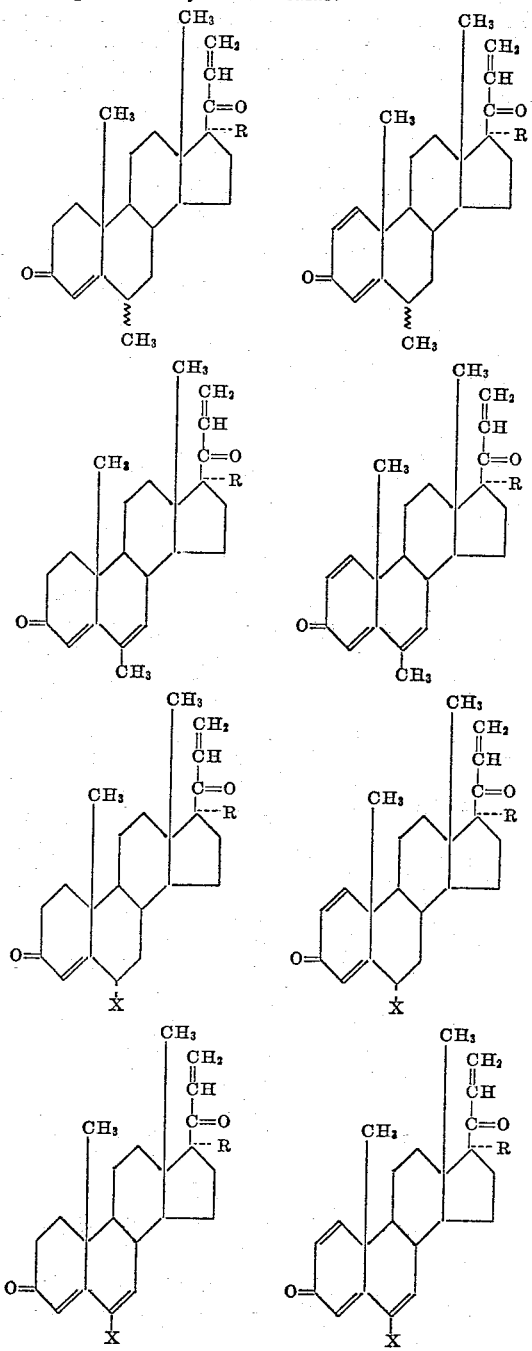

wherein X is selected from the group consisting of hydrogen, fluorine, chlorine and bromine; R is selected from the group consisting of hydrogen, hydroxyl and acylated hydroxyl, an acyl group being derived from mono- and dicarboxylic acids containing up to ten carbon atoms and alkali metal and alkaline earth metal salts of dicarboxylic acid derivatives.

2. A pharmaceutical composition comprising a compound as claimed in claim 1 and a pharmaceutically acceptable carrier.

3. 21-methylene-Δ¹,⁴-pregnadiene-17α-ol-3,20-dione.

4. 6α-fluoro-21-methylene-Δ¹,⁴-pregnadiene-17α-ol-3,20-dione.

5. 21-methylene-Δ¹,⁴-pregnadiene-3,20-dione.

6. 6α-methyl - 21 - methylene-Δ¹,⁴-pregnadiene-3,20-dione.

7. 6α - fluoro-21-methylene-Δ¹,⁴-pregnadiene-3,20-dione.

No references cited.